United States Patent [19]

Willett

[11] 4,350,873

[45] Sep. 21, 1982

[54] BAKER'S OVEN

[76] Inventor: Paul E. Willett, 43 Porter St., Redcliffe, Queensland 4020, Australia

[21] Appl. No.: 171,262

[22] Filed: Jul. 22, 1980

[51] Int. Cl.³ .............................................. A21B 1/44
[52] U.S. Cl. .................................. 219/388; 219/394; 99/443 R; 432/142; 432/138
[58] Field of Search .............. 219/388, 394, 391, 389, 219/405, 411; 99/443 R, 427, 386, 387; 432/142, 138

[56] References Cited

U.S. PATENT DOCUMENTS

| | | | |
|---|---|---|---|
| 1,637,427 | 8/1927 | Riches et al. | 219/394 |
| 2,372,362 | 3/1945 | Dawson | 99/443 R |
| 2,419,261 | 4/1947 | Groetchen | 99/443 R |
| 2,897,746 | 8/1959 | Hilgers | 99/443 R |
| 3,006,292 | 10/1961 | Hilgers | 219/391 |
| 3,204,549 | 9/1965 | Palowsky | 219/388 |

FOREIGN PATENT DOCUMENTS 1364966 5/1964 France .............................. 219/388

*Primary Examiner*—Bernard Roskoski
*Attorney, Agent, or Firm*—D. Paul Weaver

[57] ABSTRACT

A baker's oven has its casing divided by horizontal decks into a number of superimposed substantially cylindrical compartments, a loading doorway leading into each. A vertical drive shaft through the casing carries, in each compartment, a central substantially cylindrical insulated core from the lower part of which extends an annular rotating support for articles to be baked, each compartment being individually heated electrically. Each or any compartment may have an annular horizontal lid about the core, means being provided for lowering the lid onto bread tins on the support or lifting it clear above the tins.

7 Claims, 5 Drawing Figures

BAKER'S OVEN

BACKGROUND OF THE INVENTION

This invention relates to a baker's oven.

A commonly used type of baker's oven is of travelling oil or gas fired type, having an endless conveyor for support racks on which tins for bread or other bakery products are carried, the baking process being completed between the loading of the products, and their unloading after completion of a circuit within the oven. An oven of this type is large and expensive to manufacture, and it has the disadvantages that the vibration of the conveying system, and also the use of fans to promote even heat distribution within the oven, has adverse effects on certain bakery products. Moreover, such an oven is not, of course, suited to the simultaneous baking of products which have different baking requirements. Devices for lidding bread tins for the baking of sandwich loaves have been complicated and expensive in such ovens.

The general object of the present invention is to provide a baker's oven in which a variety of kinds of products with different baking requirements may be very satisfactorily baked simultaneously. Other objects achievable in preferred embodiments of the invention are to provide such an oven which incorporates very simple and effective lidding means for bread tins, is of particularly compact, simple and economical construction, which has low operating and maintenance costs, and which is very easy and convenient to load and unload.

BRIEF SUMMARY OF THE INVENTION

A baker's oven according to the invention has an insulated casing, divided by horizontal insulated decks into a number of compartments, one above the other, individual loading doorways in the casing giving access to the compartments. A substantially horizontal support for articles to be baked is rotatable in each of the compartments about a substantially vertical axis extending outwardly from the lower part of an insulated core member rotatable with the support. Heating means, preferably top and bottom electrical heating elements, are provided in each of the compartments, and drive means are provided for simultaneously rotating the supports. Preferably at least one of the compartments includes an annular substantially horizontal lid disposed about the core member, means being provided for moving it in parallelism to a lowered position upon bread tins on the support, or to a raised inoperative position above and clear of the tins. Other features of the invention will become apparent from the following description.

BRIEF DESCRIPTION OF THE DRAWINGS

A preferred embodiment of the invention is shown in the accompanying drawings, wherein.

DETAILED DESCRIPTION OF THE PREFERRED EMBODIMENT

Figure 1:
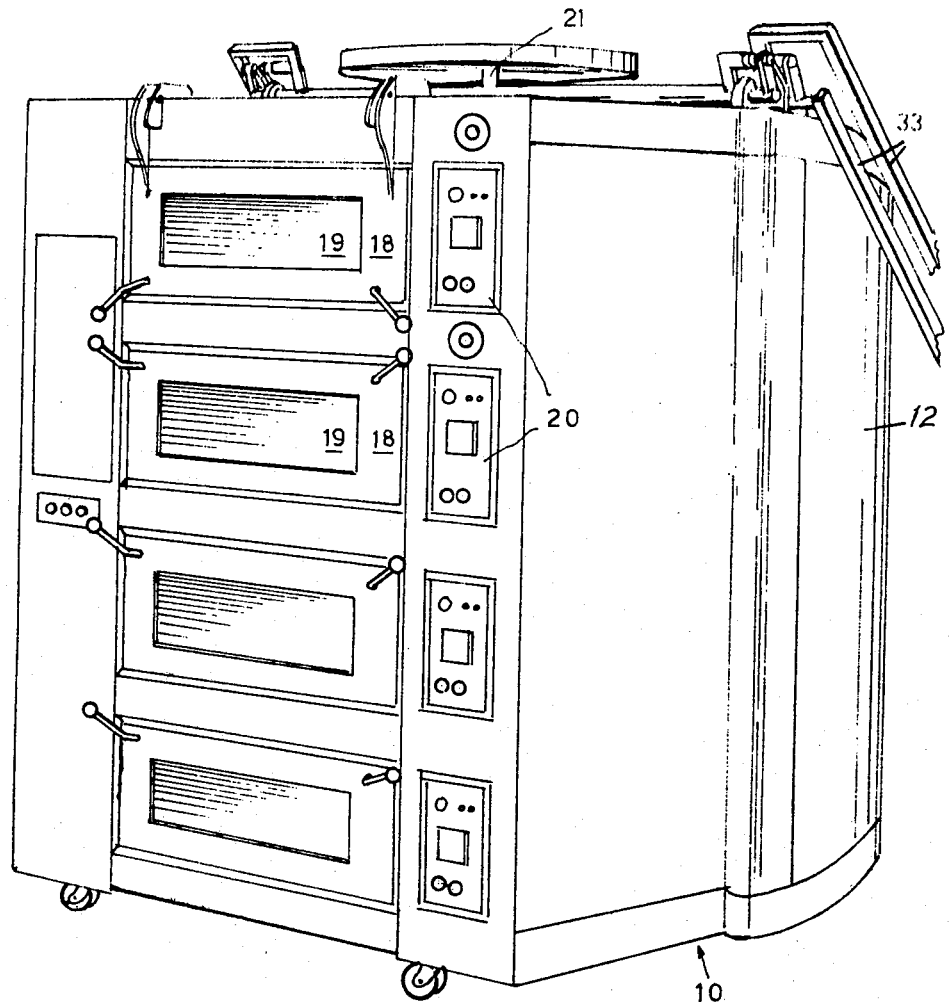
FIG. 1 is a perspective view of a baker's oven according to the invention.
Figure 2:
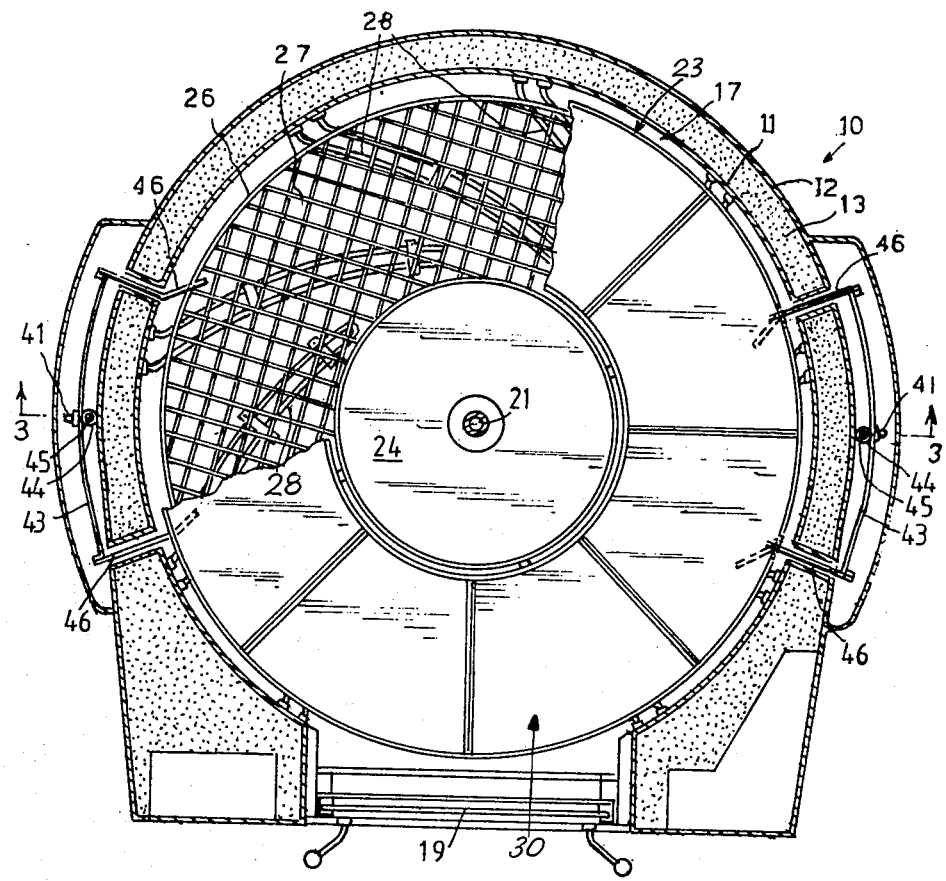
FIG. 2 is a cross-sectional view of the oven along line 2—2 in FIG. 2.
Figure 3:
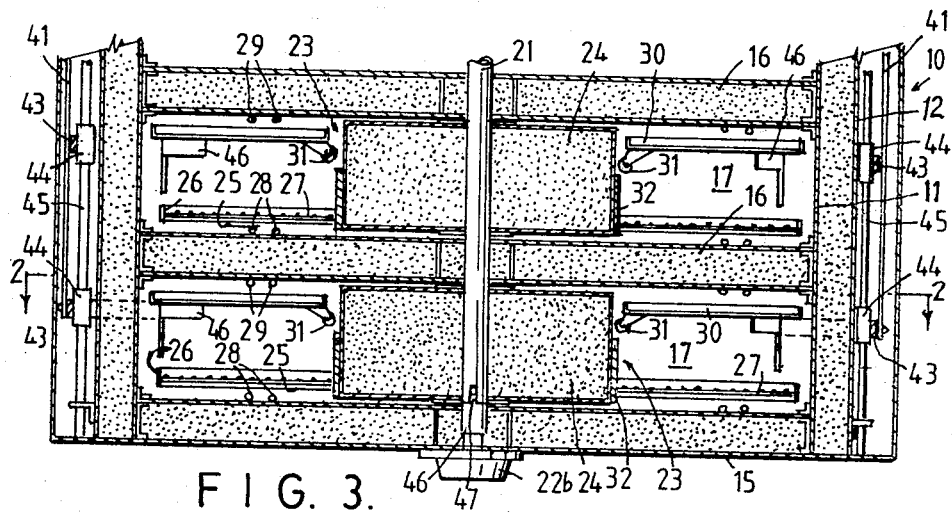
FIG. 3 is a sectional view of the bottom part of the oven along line 3—3 in FIG. 2.
Figure 4:
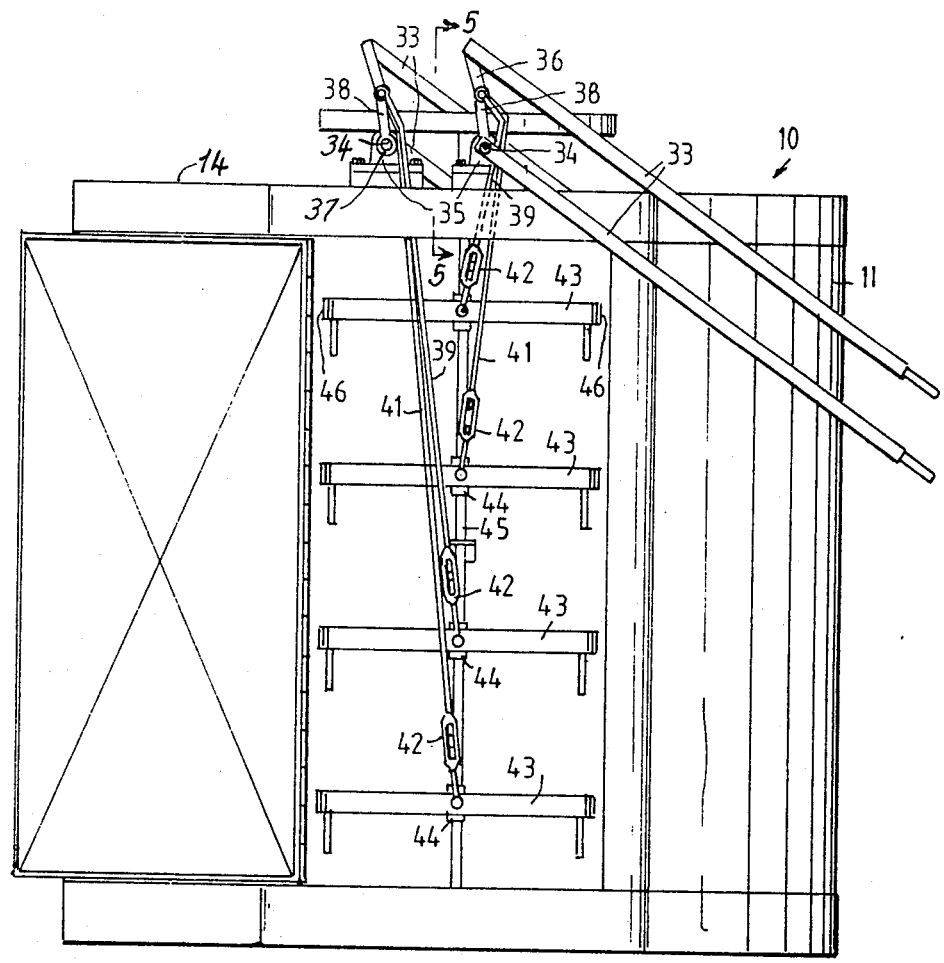
FIG. 4 is a side view of the oven with an access door opened.
Figure 5:
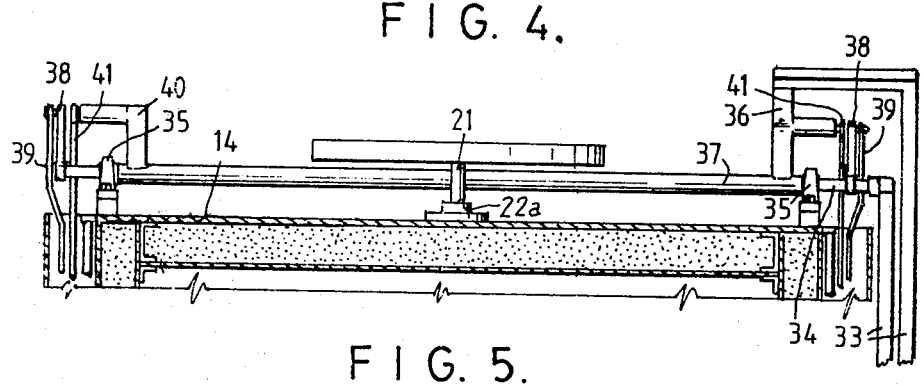
FIG. 5 is a sectional view along line 5—5 in FIG. 4.

The oven illustrated includes a casing 10 with a substantially cylindrical inner wall 11, an outer wall 12, and interposed insulating material 13, the top 14 and bottom 15 of the casing also being of insulated double-wall construction, as also are horizontal decks 16 mounted within the casing and dividing it into superimposed similar compartments 17.

The outer wall 12 has a flat front through which doorways lead individually into the compartments 17, each doorway being provided with a door 18 with a transparent window 19. Individual control panels, not shown, are provided for the oven compartments 17.

A main drive shaft 21 passes axially through the oven top 14, decks 16 and bottom 15, and is rotatable by any suitable power unit in a bearing 22a in the oven top and in a thrust bearing 22b in the oven bottom. In each compartment 17 a support tray assembly 23 is fixed on the drive shaft, each assembly including a central cylindrical core 24 of sheet metal internally reinforced and packed with heat insulating material, a series of arms 25 radiating from the core bottom to a rim 26 supporting an annular mesh tray 27. Each oven compartment 17 is individually heated by thermostatically controlled lower heating elements 28 and upper heating elements 29, each being doubled and shaped to spiral section form.

Any one or more of the oven compartments 17 may be provided with lidding means according to the invention, the oven illustrated being provided with such means in each of its four compartments. In each compartment an annular lid 30 is fitted about the core 24, being made of a number of similar flanged sectors bolted together. To facilitate the raising and lowering of the lid in parallelism, a number of rollers 31 are mounted under the inside periphery of the annular lid. When the lid is lowered, these rollers engage a sleeve 32 about the lower part of the core 24, and when the lid is raised there is some clearance between the rollers and the core. The outside periphery of the lid closely approaches the inner wall 11 of the oven.

Each of the lids 30 of the oven may be individually raised and lowered by a lidding lever 33, the four levers being mounted in pairs, one pair at each side of the oven. In each pair, one lever is secured to an end of a shaft 34 rotatable in bearings 35 on the oven casing top 14, and the other lever of the pair is fixed, by an L-shaped bracket 36, to a tubular sleeve 37 rotatable on the shaft 34 between its bearings 35, the two lidding levers 33 being arranged so that each may be moved without fouling the other.

At opposite sides of the oven, upwardly extending lever arms 38 fixed to the shaft 34 are pivotally connected to the upper ends of corresponding connecting rods 39. Also, at opposite sides of the oven, the bracket 36, and a lever arm 40 which is also secured to the tubular sleeve 37, are pivotally connected to the upper ends of corresponding connecting rods 41. All of the connecting rods are adjustable by means of turnbuckles 42.

At opposite sides of the oven, corresponding connecting rods 39 and 42 are connected to the middle parts of a pair of horizontal lifting arms 43 which are shaped to conform to the curvature of the oven wall; each lifting arm being centrally fixed to a sleeve 44 slidable on a vertical rod 45. From the ends of each lifting arm 43, two lifting fingers 46 pass through vertical slot-like openings in the oven wall and, within the oven compartment 17, are back-swept or angled towards the direction of rotation of the support tray assemblies.

In use, the heating elements 28 and 29 are operated to bring each of the oven compartments to its predetermined thermostatically controlled temperature, and the main drive shaft 21 is driven to cause the support tray assemblies 23 to be rotated at a predetermined speed. Each of the compartments 17 may be loaded with conventional baking tins for loaves, cakes or other bakery products and/or with sheet metal trays on which articles to be baked are placed. The dimensions of the core 24 and of the mesh tray 27 are such that a considerable number of rectangular bread baking tins (not shown) may be supported radially on the tray, their inner ends near to the core, their outer ends near to the rim 26. The tins, then, will be well spaced apart except at their inner ends, and therefore there will be good circulation of heated air between the tins and oven baking of their contents. Moreover, the removal of the tins at the conclusion of baking will be facilitated by this spacing, and no tins need to be loaded in front of others.

When it is required that the bread tins of any oven compartment should be lidded for the production of sandwich loaves, the appropriate lidding lever 33 is swung down so that its two connecting rods 39 and 41 descend and with them the two lifting arms 43 and the lid 30, previously held stationary within the upper part of the compartment. When the lid is lowered onto the baking tins, its rollers 31 are brought down onto the sleeve 32 about the core 24, so the lid is caused to turn with the rotating core. To raise the lid 30, the appropriate lidding lever 33 is swung up, to bring the lever arms 38, or the bracket 36 and lever arm 40, beyond "dead centre" positions, so the lid 30 is lifted to, and retained in, raised position.

It will be found that the spiral arrangement of the heating elements ensures even heating of the products being baked and, most of the unused space of each oven compartment being occupied by the insulated core 24, little pre-heating of any compartment will be required before commencing baking. The oven, although very economical of space, may be used to bake a variety of products at the same time, at different temperatures if required.

An oven according to the invention may have two or three compartments instead of the four illustrated, and may be readily enlarged by superimposing it on a supplementary one-compartment or two-compartment unit. For this purpose, the main drive shaft 21 may include a bottom end-piece 46 rotatable in the thrust bearing 22b and removably engaged in the tubular main part of the drive shaft, a pin and slot device indicated at 47 preventing relative rotation of the two parts. To add an extra compartment at the bottom of the oven, it is then necessary only to remove the thrust bearing 22b and replace it on the bottom of the supplementary unit, and to lengthen the drive shaft by interposing an appropriate lengthening piece between the main part of the drive shaft and its end-piece 46.

I claim:

1. A baker's oven of the type having a casing with an interior of substantially vertical cylindrical form and being divided into a plurality of superimposed substantially cylindrical compartments, a loading door leading into each of said compartments, a shaft passing substantially coaxially through said compartments, a substantially horizontal support for articles to be baked within the lower part of each compartment and mounted on said shaft, heating means in each compartment, and means for driving said shaft to rotate simultaneously said supports, the improvement comprising substantially horizontal heat insulating decks separating said compartments and being peripherally connected to said casing and centrally closely engaged about said shaft, and a substantially cylindrical heat insulating core in each compartment disposed coaxially about said shaft and extending upwardly from said support to a position close to the top of said compartment and rotating with said support.

2. A baker's oven as defined in claim 1, wherein said heating means of each compartment includes lower electrical heating elements on the bottom of said compartment below said support and upper electrical heating elements under the top of said compartment, each heating element being substantially of horizontal spiral form, both said lower elements and said upper elements being substantially equally spaced apart and being convergent toward the center of said compartment.

3. A baker's oven as defined in claim 1, wherein there is provided at least in one of said compartments an annular lid extending substantially horizontally outwardly from said core, and lifting means for moving said lid vertically in parallelism to lower it onto or raise it from articles to be baked.

4. A baker's oven as defined in claim 3, and means for automatically engaging said lid with said core to rotate therewith when said lid is in a lowered position and for freeing said lid from said core when it is in its raised position.

5. A baker's oven as defined in claim 3, wherein said lifting means includes fingers entering the sides of said compartment and supporting said lid, and means for simultaneously raising and lowering said fingers.

6. A baker's oven comprising a casing, a plurality of compartments one above the other within the casing, each two compartments being separated by a substantially horizontal deck, a loading doorway in the casing for each of the compartments, a substantially horizontal support for articles to be baked rotatable in each of the compartments about a substantially vertical axis, a core member in each compartment disposed about the axis of rotation of the support, heating means in each of the compartments, means for simultaneously rotating supports, there being provided in at least one of the compartments a substantially horizontal annular lid about and extending outwardly from the core member, means for moving the lid vertically in parallelism to lower it onto bread tins or the like on the support or to lift it to a raised position, and means for automatically engaging the lid with the core for rotation therewith when the lid is in its lowered position and for freeing the lid from the core when it is in its raised position.

7. A baker's oven according to claim 6 wherein:
the means for moving the lid vertically includes fingers entering the sides of the compartment and supporting the lid, and
means for simultaneously raising or lowering the fingers.

* * * * *